United States Patent

Lowy et al.

[11] 3,787,124
[45] Jan. 22, 1974

[54] DUAL WAVELENGTH PHOTOMETER FOR ABSORBANCE DIFFERENCE MEASUREMENTS

[75] Inventors: George W. Lowy, Silver Spring; Paul Priarone, Hyattsville; Herbert M. Cullis, Silver Spring, all of Md.

[73] Assignee: Baxter Laboratories, Inc., Morton Grove, Ill.

[22] Filed: Sept. 21, 1972

[21] Appl. No.: 291,046

[52] U.S. Cl............... 356/205, 23/253 R, 250/218, 356/188
[51] Int. Cl. ........................................... G01n 21/24
[58] Field of Search 23/253 R; 356/51, 96, 97, 184, 356/186, 188, 205, 212, 95, 93, 182; 250/218

[56] References Cited
UNITED STATES PATENTS

| | | | |
|---|---|---|---|
| 3,279,308 | 10/1966 | Bartz et al. | 356/95 X |
| 3,520,614 | 7/1970 | Goldstein | 356/97 |
| 3,666,362 | 5/1972 | Chance | 356/93 X |
| 3,694,086 | 9/1972 | May | 356/97 X |
| 3,706,497 | 12/1972 | Lindberg | 356/188 |
| 3,030,192 | 4/1962 | Schneider | 356/182 X |

Primary Examiner—Ronald L. Wibert
Assistant Examiner—F. L. Evans
Attorney, Agent, or Firm—Herman L. Gordon

[57] ABSTRACT

A dual wavelength photometer for measuring the oxygenation characteristics of blood. Light is passed through two different filters on a rotating time-sharing wheel, one filter providing a reference wave length at which there is substantially no absorbance change as between oxygenated and deoxygenated blood, the other filter providing a wavelength at which there is maximum absorbance change. The two wavelengths are sequentially passed through a cuvette containing deoxygenated blood being treated at controlled rates with an oxygenating reagent and changes in absorbance are detected by a photomultiplier which generates corresponding signals. A time-shared difference-measuring circuit, synchronized with the rotating wheel, receives the signals and derives a resultant absorbance difference signal which is delivered to a recorder. The trace provided by the recorder shows the change in absorbance-difference with time as blood oxygenation proceeds.

16 Claims, 13 Drawing Figures

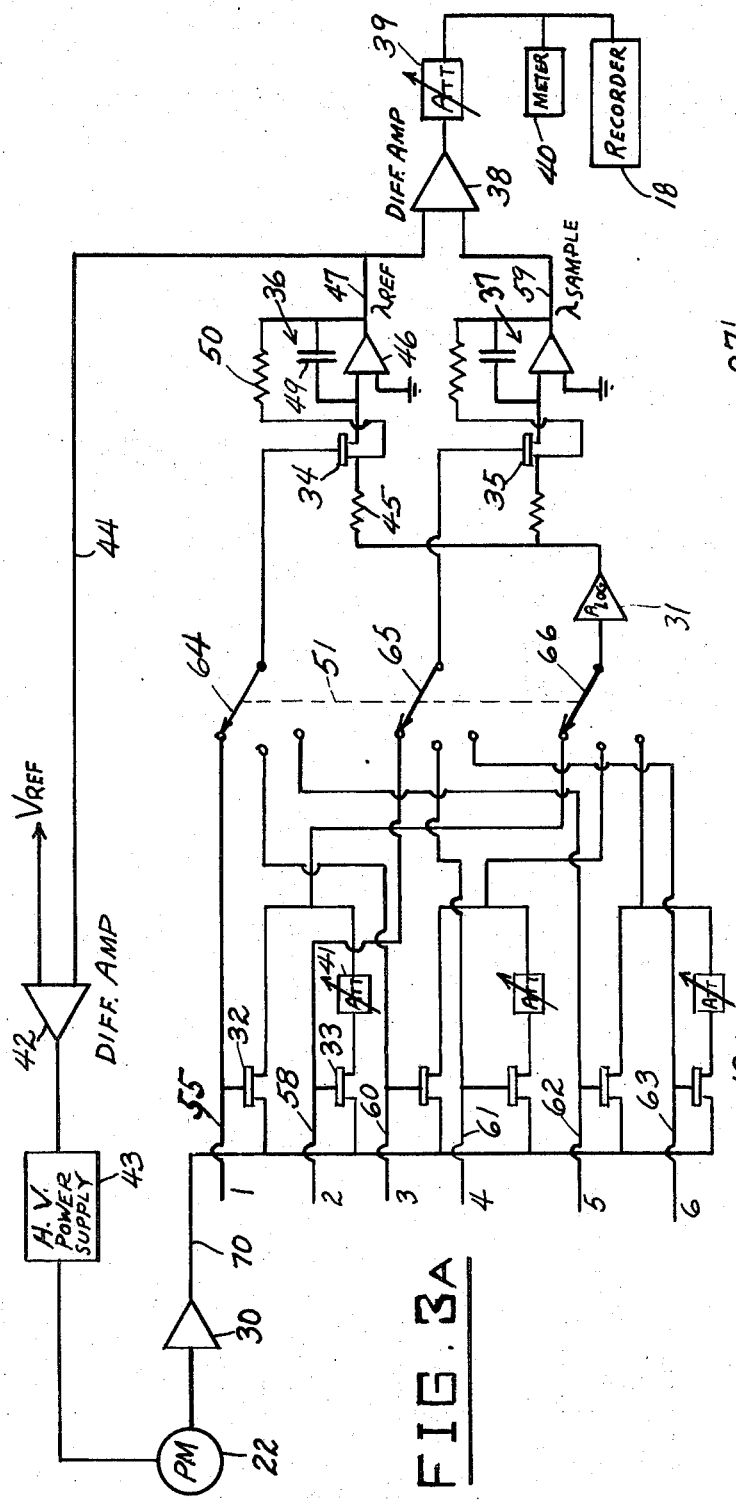
FIG. 3A
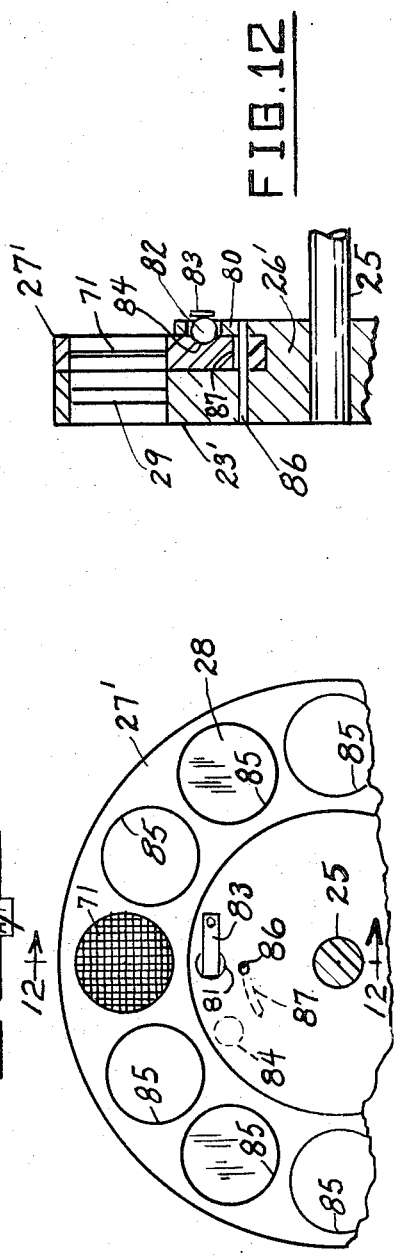
FIG. 12
FIG. 11

DUAL WAVELENGTH PHOTOMETER FOR ABSORBANCE DIFFERENCE MEASUREMENTS

This invention relates to dual wavelength photometer apparatus, and more particularly to an apparatus for measuring the oxygenation characteristics of blood or for measuring the titration characteristics of any other material being treated with a reagent which changes the light-absorbing properties of the material.

A main object of the invention is to provide a novel and improved dual wavelength photometer apparatus for differentially studying the changes in light-absorbing properties of materials being treated with reagents which modify the light absorbing properties, the apparatus being relatively simple in construction, being highly accurate, and providing a clear and reliable indication of the change in absorbance of a component of a material being treated with a reagent, whereby the progress of the treatment may be readily and conveniently observed.

A further object of the invention is to provide an improved dual wavelength photometer apparatus for differentially studying the changes in light absorbance of a material exposed to two different wavelengths and for automatically calculating and recording the absorbance difference as the material is treated with a reagent, whereby to show the progress of the treatment, the apparatus employing an improved time-sharing arrangement including a computing circuit which is accurately synchronized with the optical portion of the apparatus.

A still further object of the invention is to provide an improved dual wavelength photometer apparatus which may be employed to study titrations, such as the treatment of deoxygenated blood with an oxygenating reagent, whereby to obtain an indication of the progress of a reaction or treatment by showing the change in absorbance of a particular wavelength as compared with a reference wavelength as the reaction or treatment proceeds, the apparatus employing relatively inexpensive components, being easy to calibrate, being stable in operation, and providing accurately reproducible data.

A still further object of the invention is to provide an improved apparatus for photometrically studying the rate at which deoxygenated blood can become oxygenated and which enables physiologic and pathologic shifts and changes in the oxygen equilibrium of blood to be quantitatively recognized, and which circumvents optical problems such as those which would be introduced by the light scattering effects of turbid suspensions of cells.

Further objects and advantages of the invention will become apparent from the following description and claims, and from the accompanying drawings, wherein:

FIG. 3A is a parital block diagram of a modified form of the circuit of FIG. 3, simplified to reduce the number of required components and employing channel switching.

FIG. 9 is an enlarged vertical cross-sectional view taken substantially on the line 9—9 of the typical apparatus of FIG. 3, namely, through the titration cuvette employed in the apparatus.

FIG. 10 is a horizontal cross-sectional view taken substantially on line 10—10 of FIG. 9.

FIG. 11 is a fragmentary cross-sectional view similar to FIG. 6, but showing a modification.

FIG. 12 is a fragmentary cross-sectional view taken substantially on line 12—12 of FIG. 11.

Blood, itslef or in any of its isotonic dilutions, yields turbid suspensions of cells with significant light scattering properties which complicate or prevent accurate spectrophotometric measurements. Only dual-wavelength spectrophotometry circumvents these problems by the continuous and essentially simultaneous measurement of the differences in optical absorbance of a sample at two different wavelengths. This permits a quantitive measurement of the conversion of one chemical species into another, provided the total concentration of the species remains constant. In accordance with the present invention, a duo-chromator device provides the required two beams of superimposed monochromatic light. One of these provides a reference wavelength and the second provides a wavelength at which maximal changes in absorbance occur while the sample is being transformed from one chemical state into another. The two selected wavelengths are relatively close together so that wavelength-dependent light scattering effects are, for all practical purposes, identical at the two wavelengths. Furthermore, the selected reference wavelength is preferably at an isobestic point so that it is possible to measure the transformation of the two states, even in a multicomponent system, without interference due to other typically absorbent compounds.

Figure 1:
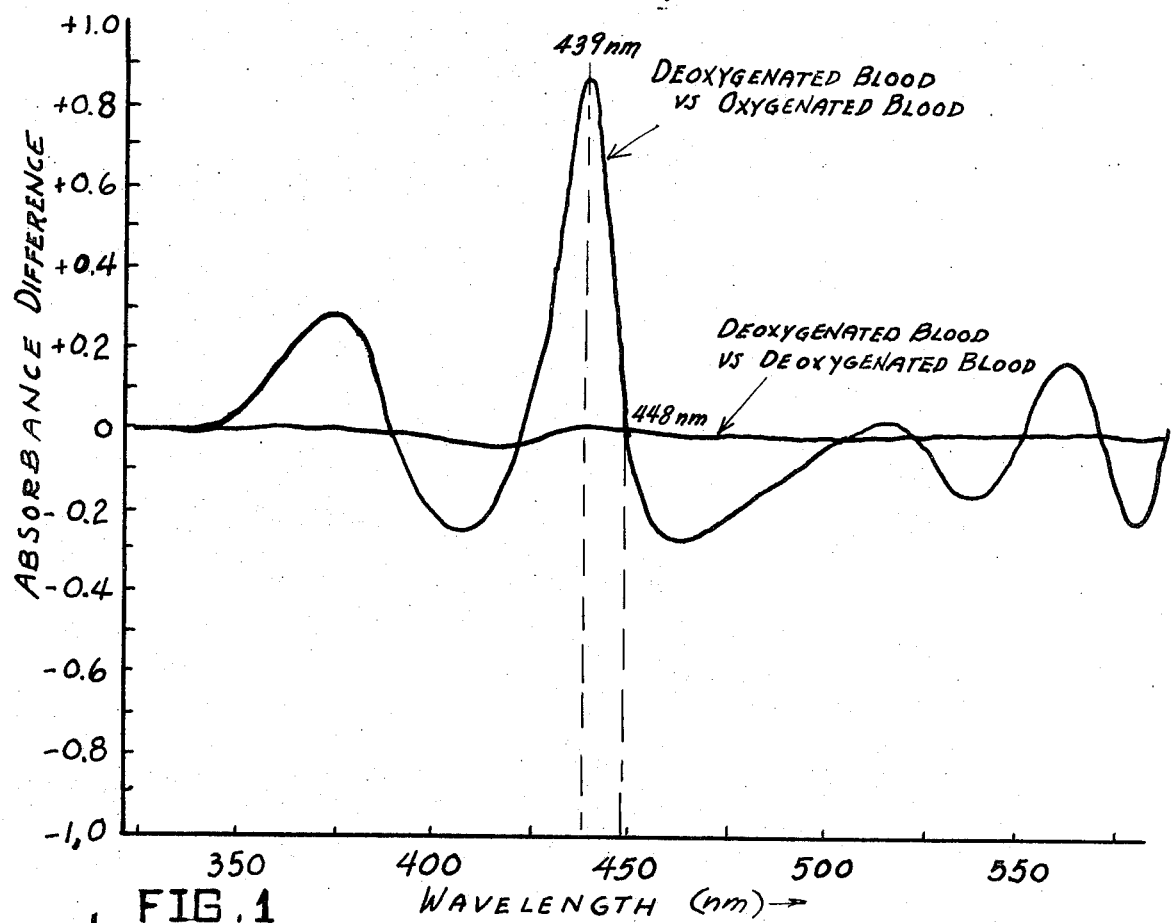
FIG. 1 is a set of curves representing the differential absorption spectra of deoxygenated versus oxygenated blood.

These two wavelengths can be derived from a differential spectrum of two chemical states of the same compound. These states, as contemplated in the method used in the present invention, are those of oxygenated and deoxygenated blood and its dilutions. A difference spectrum obtained with a conventional split-beam scanning spectrophotometer is shown in FIG. 1. It yields several pairs of wavelengths suitable for a quantitative measurement of the oxygenation of erythrocytic deoxyhemoglobin. The wavelengths at 439 nm and 448 nm fulfill the requiremnts of the method, and in addition provide a high sensitivity. The spectrophotometric titrations of deoxygenated blood and its dilutions, as performed with an apparatus according to the present invention, may be therefore typically performed using the wavelengths of 439 nm and 448 nm for the two monochromatic light beams. The difference in light absorbance that occur between these two wavelengths are recorded, thereby alleviating any nonspecific abosrgance changes based on light scattering changes of the sample.

In a typical procedure employing the apparatus of the present invention, in order to generate oxygen at a constant rate in the optical cell or cuvette containing solely a blood sample in the liquid phase, a dilute hydrogen peroxide solution of known concentration may be employed as titrant and catalase as a decomposition catalyst. Oxygen is thereby generated stoichiometrically at a rate which is proportional to the rate of the controlled titrant flow into the cuvette.

Thus, the cuvette 11, shown in detail in FIGS. 9 and 10, may comprise a transparent rectangular container 12 of square cross-section having a top sealing plug or cover 13 which has titrant supply tubes 14 connected thereto at diagonally opposed corner apertures or bores provided therein and which has a central vent tube 15, the bottom face of the plug or cover 13 being downwardly spherically concave, as shown at 16, to facilitate smooth venting of gases from he top portion of the cuvette. The cuvette may contain in its bottom portion a stirrer rod 17 of magnetic material which may be rotated by means of a conventional suitably energized external electromagnetic driving means located subjacent the cuvette.

The titrant may be supplied to the tubes 14 by means of a suitable syringe-pump assembly, not shown, at a variable but highly reproducible rate. In a typical procedure, the syringe contains a solution of about 0.02 M $H_2O_2$ in 0.154 M NaCl with a concentration of about 0.0001 M of trisodium EDTA as hydrogen peroxide stabilizer. The pump system may be such as to provide titrant flow rates ranging from about two to 20 microliters per mintue which are accurately reproducible within ± 0.5 percent.

The plug or cover 13 is adapted to provide a barrier completely preventing any gas exchange between the liquid contents of the cuvette and the outside atmosphere.

Figure 3:
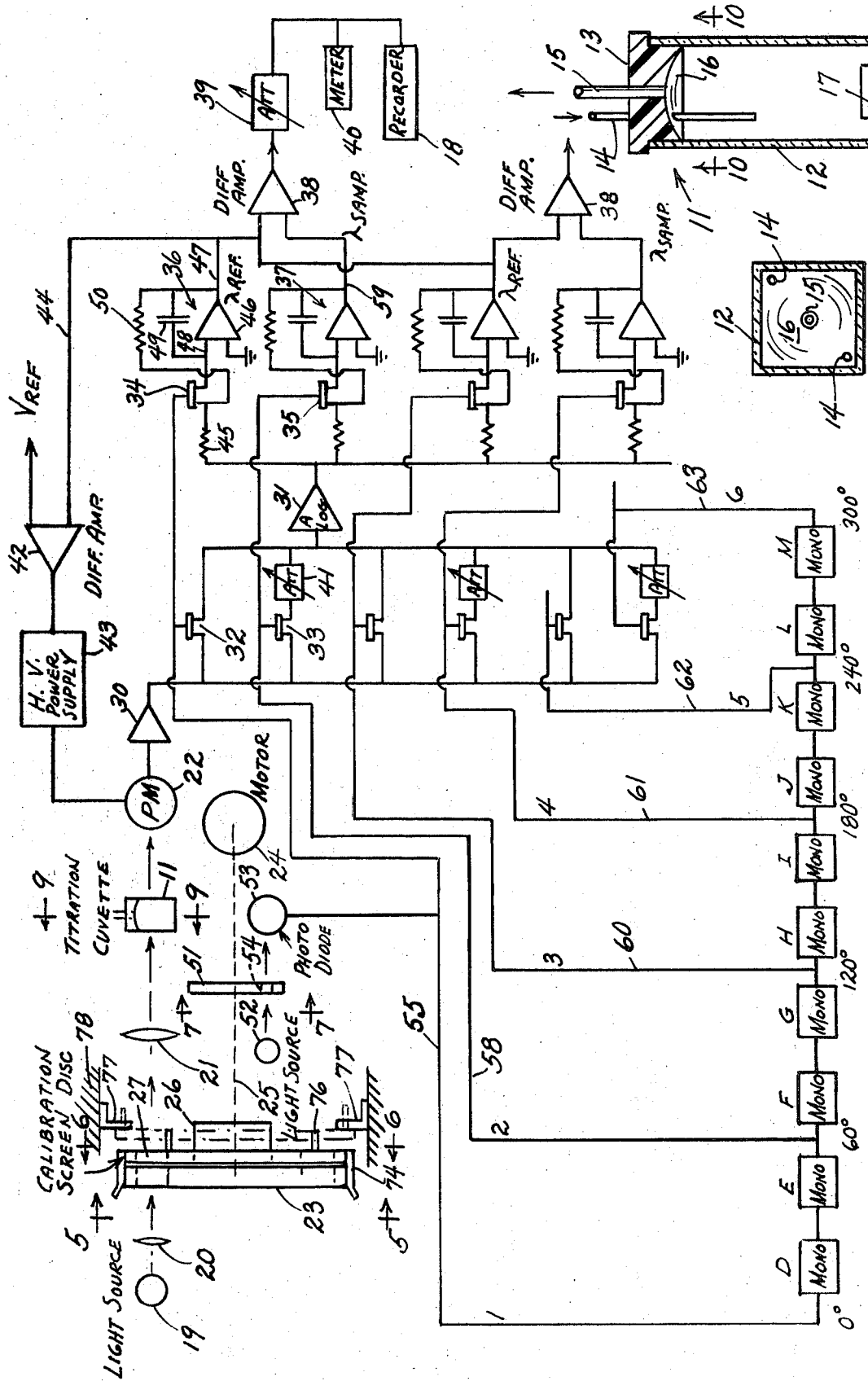
FIG. 3 is a schematic diagram, partly in block form, of a typical dual wavelength photometer according to the present invention, shown with its calibration disc member in calibrating position.
Figure 4:
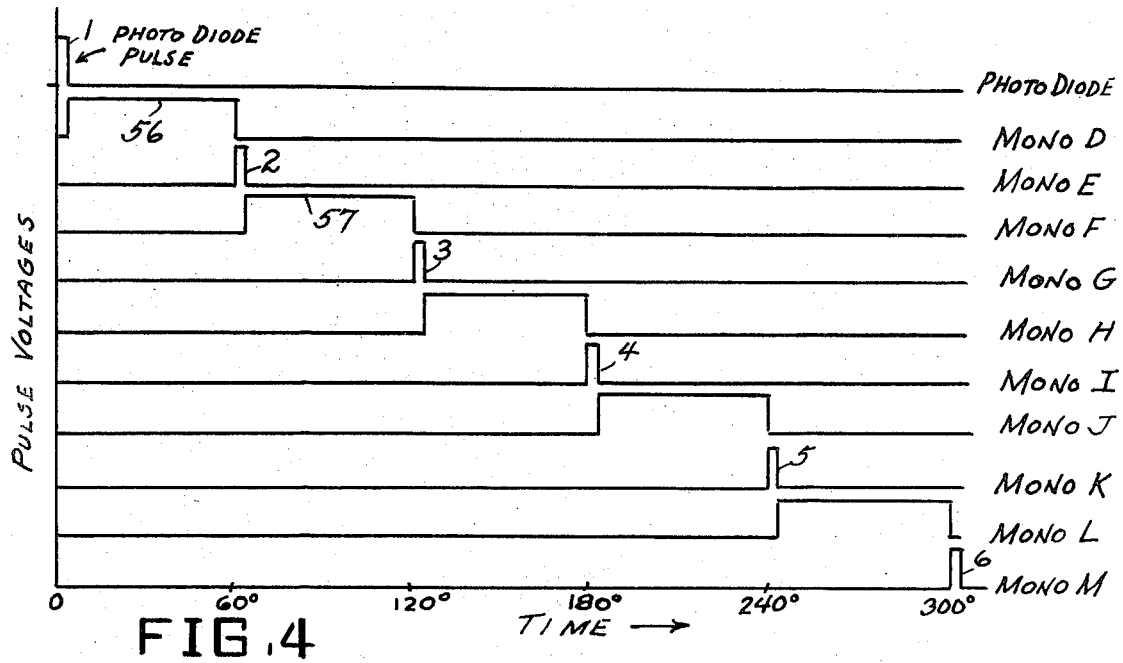
FIG. 4 is a diagram showing the wave forms of synchronization pulses derived from the synchronization circuit portion of the apparatus of FIG. 3.

The photometer of the present invention is provided with a suitable cell holder for supporting a cuvette 11 charged with a deoxygenated sample of blood or blood dilution in a suitable position for absorbance measurements, such as that diagrammatically illustrated in FIG. 3.

Blood samples and blood dilutions, as well as buffers and saline solutions, may be deoxygenated at titration temperatures (for example, 25°C or 37°C) by shaking the suspensions in suitable glass vessels mounted on a shaker platform for 20 minutes with a 1 cm stroke at 120 cycles per minute. During this time, the vessels are purged by a flow of water saturated gases, or gas mixtures, as determined by the requirements of the suspension medium. With 0.154 M "Bis-tris".HCl buffer, pH 7.4, or 0.154 M of NaCl, the gas for the removal of $O_2$ is either argon or nitrogen (carrier grades). With Krebs-Ringer-bicarbonate as diluent, the gas is 5 percent (by volume) $CO_2$ in 95 percent $N_2$. These diluents, except the NaCl solution, have a sufficiently high buffering capacity to maintain constant pH while the blood undergoes oxygenation.

In order to assure oxygen-free transfer of the sample from the deoxygenation vessel into the cuvette 11, the gas escaping from the vessel is vented directly into the cuvette through the stopper 13 by means of polyethylene tubing. This tubing is attached to the side arm of an Erlenmayer-shaped deoxygenation vessel (Warburg flask). The anaerobic transfer may then be accomplished by simply tipping the vessel and thereby replacing the gas flow by a liquid flow. The tubing is subsequently withdrawn from the cuvette, which now contains only a single liquid phase extending up to stopper 13. The cuvette, thus charged, may then be transferred into the photometer cell holder for titration.

During the titration, a hydrogen peroxide solution of known concentration is introduced through tubes 14 at a constant and precisely known rate (microliters per minute) into the cuvette 11 which contains the deoxygenated blood dilution and a sufficient quantity of added catalase. The catalase converts $H_2O_2$ almost instantaneously into $H_2O$ and $O_2$ which serves in the oxygenation of the erythrocytic deoxyhemoglobin. This, in turn, causes a change in the difference between the optical absorbances of the sample at 439 nm and 448 nm which is measured quantitatively by the dual wavelength photometer of the present invention, as will be presently described. The photometer output is recorded on the chart of a recorder 18, (FIG. 3) as an absorbance change versus time. The time axis may be in the following equivalent units: (1) minutes, (2) $\mu$l titrant flow, (3) $\mu$moles $H_2O_2$, (4) $\mu$moles $O_2$, or (5) partial pressure of $O_2$.

Figure 2:
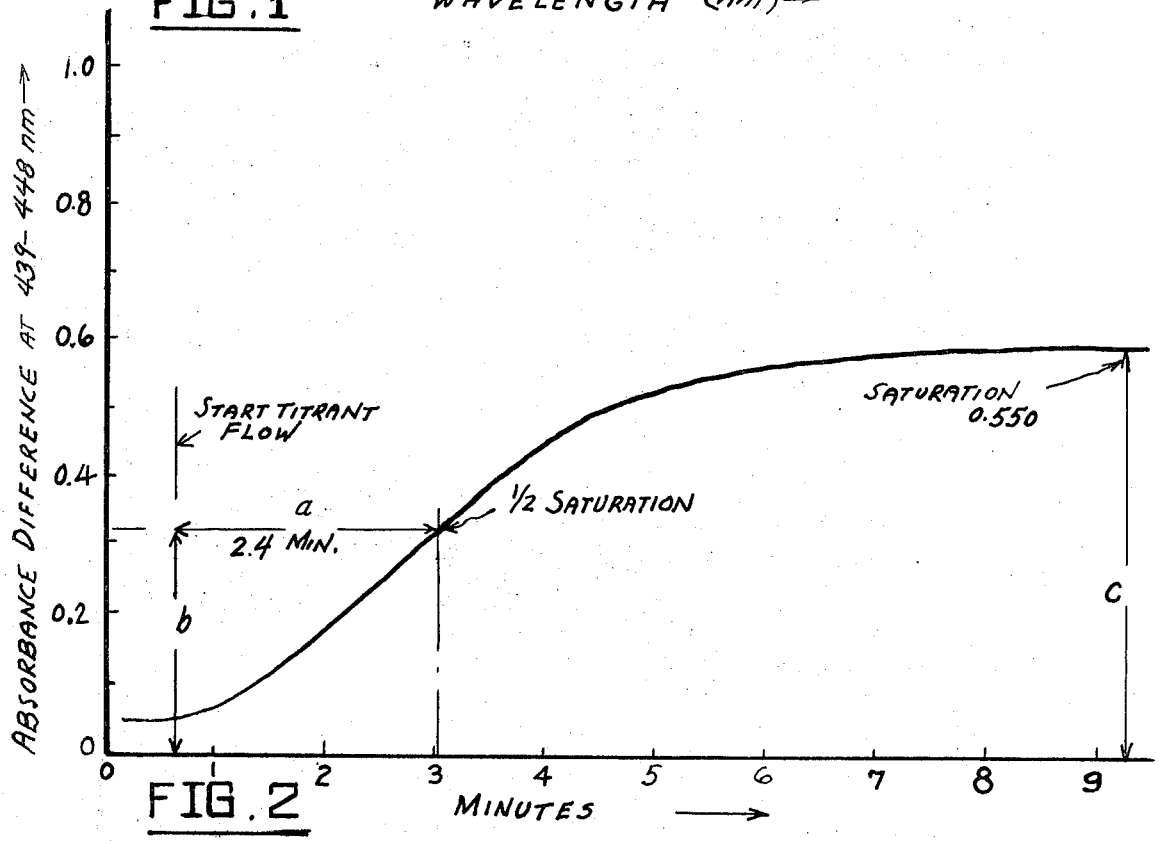
FIG. 2 is a typical recording of the oxygenation of an originally deoxygenated blood sample, such as would be obtaind by an apparatus according to the present invention, showing the absorbance difference change with time as between a reference wavelength of 448 nm and a test wavelength of 439 nm, from FIG. 1, as oxygenation proceeds.

A typical example of a recording of an oxygen dissociation curve obtained by the use of the apparatus of the present invention substantially employing the above-described method, is shown in FIG. 2, said curve providing data for a quantitative evaluation thereof.

In FIG. 2, titrant flow was started at a time corresponding uo the vertical line b and photometric observation continued for approximately 10 minutes, during which the curve of FIG. 2, representing the change in the optical absorbance difference occurring between the 439 nm and 448 nm wavelengths, was recorded. The curve of FIG. 2 is a typical sigmoidal "oxygen dissociation curve", following the progressive oxygenation of normal human blood, and approaching its final value asymptotically. It can be seen from FIG. 2 that the distance $b$ ( equal to ½ c) represents one half of the total oxygenation of deoxyhemoglobin. A horizontal line drawn at half saturation height $b$ intersects the oxygenation curve at a distance corresponding to 2.4 minutes of titrant flow. From the data given by this curve and other known data associated with the experiment, the total generation of oxygen at distance $a$ , as welll as the portion of the total oxygen produced bound by hemoglobin can be calculated. Also, the partial pressure of oxygen at half oxygenation of the hemoglobin $(pO_2)$½ can be determined from the data available from the curve of FIG. 2. Corresponding calculations may be made with respect to other points on the curve other than the half saturation point.

Referring to Fig. 3, the photometer apparatus employed to derive the oxygenation recording of FIG. 2 comprises a suitable source of radiation 19, such as a lamp emitting visible radiation. The output of source 19 is directed by respective lenses 20 and 21 through the cuvette 11 to a photomultiplier tube 22. Interposed between the lenses 20 and 21 is a rotary time-sharing filter disc member 23 to which is drivingly connected a motor 24, the disc member 23 being suitably mounted on the motor shaft, shown diagrammatically at 25. The disc member 23 is provided with a collar portion 26 which serves as a guide for a calibration density screen disc 27, presently to be described.

Figure 5:
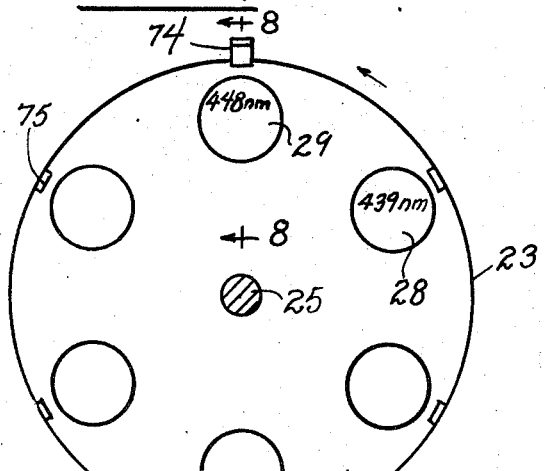
FIG. 5 is an enlarged vertical cross-sectional view taken substantially on the line 5—5 of a typical apparatus according to FIG. 3.
Figure 6:
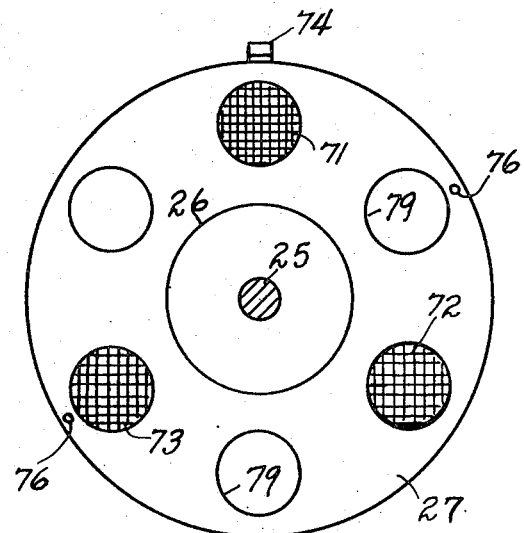
FIG. 6 is an enlarged vertical cross-sectional view taken substantially on the line 6—6 of the typical apparatus of FIG. 3.

The disc member 23 is provided with a plurality of evenly spaced filter windows located at common radial distances from the axis of shaft 25 and located so as to sequentially insert the filter windows in the optical path defined by the lenses 20 and 21. There are an even number of filter windows, and the windows contain respective filters comprising pairs spaced at the same phase angle, one of each pair providing a reference wavelength and the other providing a nearby measure wavelength for the associated channel. Thus, in the typical duochromator disc 23 illustrated in FIG. 5, there are three channels, each defined by a pair of filter windows spaced at the same phase angle. As shown in FIG. 5, one channel may be defined by a 439 nm filter window 28 spaced 60° from a 448 nm filter window 29, thus providing the sequential observation monochromatic beams above mentioned in connection with FIG. 1.

The phase spacing between the pairs of filter windows forming the respective dual wavelength channels may be other than 60°, for example, 120° or 180°, is so desired, the 60° phase spacing being illustrated merely by way of a typical example.

Each cycle of rotation of disc member 23 thus produces a reference beam of 448 nm monochromatic light followed by another beam of 439 nm monochromatic light constituting the measure beam, said beams passing sequentially through the cuvette 11 to the pyotomultiplier tube 22.

The resultant signals from the photomultipler tube 22 are delivered through an amplifier 30 to a logarithmic amplifier 31 through appropriately triggered electronic switch devices 32 and 33 so as to arrive at the input of amplifier 31 substantially in synchromism with the aforesaid reference and measure beams. The resultant logarithmic output signals from amplifier 31 are delivered through respective similarly triggered electronic switch devices 34 and 35 to respective "track and hold" integrating circuits 36 and 37 which generate corresponding steady d.c. output voltages representing the logarithmic output pulse signals, which are supplied simultaneously to the two inputs of a differential amplifier 38. The output of amplifier 38, which substantially comprises the difference between the steady d.c. input signals from circuits 36 and 37, is delivered through a variable calibrating attenuator device 39 to a meter 40 and to the recorder 18.

The triggered circuit branch containing the electronic switch device for closing the switch device synchronously with the exposure of the cuvette 11 to the 439 nm measure beam also contains a variable attenuator device 41 for suitably balancing the signals furnished to amplifier 31 at the beginning of a test.

In order to substantially compensate for the nonlinearity of the response characteristic of the photomultiplier tube 22, the dynode voltage thereof is regulated in accordance with the steady d.c. voltage derived at the output of the integrating circuit 36. Thus, the output voltage of circuit 36 is compared with a reference voltage in a differential amplifier 42, and the output signal of amplifier 42 is utilized in a conventional manner to adjust the voltage output value of a high voltage power supply device 43 furnishing the photomultiplier dynode voltage. This comparison is obtained by connecting the output of circuit 36 through a conductor 44 to one of the input terminals of the differential amplifier 42, as shown in FIG. 3.

The operation of the "track and hold" integrating circuit 36 is as follows: a pulse from the output of logarithmic amplifier 31 passes through a resistor 45 and field effect transistor 34 to an input terminal 48 of an amplifier 46 and the amplified pulse appears at the output terminal 47 of amplifier 46. A capacitor 49 connected between input terminal 48 and output terminal 47 is charged to a d.c. voltage corresponding to the amplitude of the input-output voltage drop. A discharge resistor 50 is connected across capacitor 49 through field effect transistor 34 to allow the capacitor to adjust its charge with changing amplitudes of input pulses, the triggering of the field effect transistor 34 being synchronized with the input pulses. Thus, a steady d.c. voltage appears at output terminal 47 which is in accordance with the amplitude of the input pulse applied at terminal 48, this steady d.c. voltage being maintained until the next triggering of the field effect transistor 34, at which time its value may be changed because of a different amplitude of the next input pulse. The "track and hold" integrating circuit 37 operates in the same manner.

Respective trigger circuit branches and associated "track and hold" circuits may be provided for the additional dual wavelength channels afforded by the above-described disc member 23, with a associated differential amplifier 38, variable attenuator 39, meter 40 and recorder 18 for each channel.

A pulse keying disc 51 is mounted on shaft 25 between an auxiliary light source 52 and a stationary photo diode 53. The disc 51 has an aperture 54 which becomes aligned with the optical path between the lamp 52 and photo diode 53 simultaneously with the alignment of the first filter window 29 of disc 23 with the optical path defined between the lenses 20 and 21. Photo diode 53 may be of the photovoltaic type, or alternative, may be connected in a suitable circuit arranged to generate a timing pulse 1 responsive to each passage of light through aperture 54 impinging on the photo diode 53. The pulse 1 generated by photo diode 53 is delivered to a conductor 55 leading to the input of a chain of monostable oscillators D to M, shown in FIG. 3. Pulse 1 generates a rectangular pulse 56 in monostable oscillator D of a duration such as to generate a narrow pulse 2 in monostable oscillator E at precisely the time that the second filter window 28 moves into the optical path defined between the lenses 20 and 21. Pulse 2 generates a rectangular pulse 57 in monostable oscillator F, which similarly is of a duration to generate a narrow pulse 3 in monstable oscillator G at precisely the time that the third filter window moves into the optical path defined between lenses 20 and 21. In the same manner, additional pulses 4, 5 and 6 are generated respectively in the monostable oscillators I, K and M, synchronized with the alignment of the remaining filter windows with the optical path defined between the lenses 20 and 21.

Thus it will be seen that the pulses 1 to 6 are spaced apart by even time intervals corresponding to the 60° spacing between successive filter windows of the filter disc 23.

The conductor 55 carrying pulse 1 is connected to the triger electrodes of the field effect transistors 32 and 34 so that these transistors are rendered conductive simultaneously with the presence of the 448 nm reference wavelength filter 29 in the optical path between lenses 20 and 21. This connects the output of the amplifier 30 to the input of the logarithmic amplifier 31 and simultaneously connects the output of amplifier 31 to the "track and hold" circuit 36, providing the above-mentioned steady d.c. voltage at terminal 47, connected to one of the input terminals of differential amplifier 38.

A conductor 58 carrying pulse 2 is connected to the trigger electrodes of the field effect transistors 33 and 35 so that these transistors are in turn rendered conductive simultaneously with the presence of the 439 nm measure wavelength filter 28 in the optical path between lenses 20 and 21. This correspondingly connects the output of amplifier 30 to the input of logarithmic amplifier 31 and simultaneously connects the output of amplifier 31 to the "track and hold" circuit 37, providing the steady d.c. voltage at the output terminal 59 corresponding to the response of the photomultipler tube 22 to the measure wavelength, and which is supplied to the other input terminal of differential amplifier 38.

Additional conductors 60, 61, 62 and 63, carrying the pulses 3, 4, 5 and 6, are connected to the trigger electrodes of the field effect transistors associated with the two other dual wavelength channels of the system.

If the phase spacing between the pairs of filter windows forming the respective dual wavelength channels is chosen so as to be other than 60°, such a 120° or 180°, as above mentioned, the connections of the conductors 58, 60, 61, 62 and 63 to the trigger electrodes of the field effect transistors and the connections of the output terminals of the "track and hold" circuits to the respective differential amplifiers 38 are changed accordingly.

By employing suitable selector switching, the same "track and hold" circuits 36 and 37, differential amplifier 38, variable attenuator 39, meter 40 and recorder 18 may be employed for each dual wavelength channel, for example, as shown in FIG. 3A, wherein a 3-pole, 3-position manually operated selector switch 51 is utilized for this purpose. In the typical channel-switching circuit of FIG. 3A, the switch 51 has the respective poles 64, 65 and 66. Pole 64 is connected to the trigger electrode of field effect transistor 34 and pole 65 is connected to the trigger electrode of field effect transistor 35. Pole 66 is connected to the input of logarthmic amplifier 31. In the first channel position, pole 64 is connected to the pulse 1 conductor 55, pole 65 is connected to the pulse 2 conductor 58, and pole 66 is connected to the output line 70 of amplifier 30 through a parallel circuit comprising field effect transistor 32 as one branch and field effect transistor 33 and attenuator 41 as the other branch. This utilizes the spaced keying pulses 1 and 2 and provides the same mode of operation as in FIG. 3, for the first dual wavelength channel.

Figure 8:
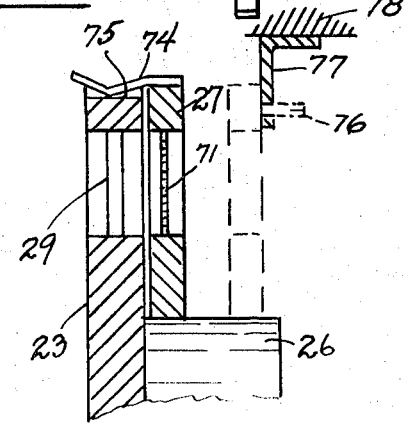
FIG. 8 is an enlarged fragmentary vertical cross-sectional view taken substantially on the line 8—8 of FIG. 5.
Figure 7:
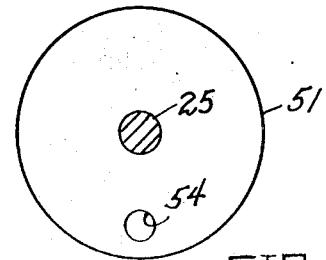
FIG. 7 is an enlarged vertical cross-sectional view taken substantially on the line 7—7 of the typical apparatus of FIG. 3.

In the second and third channel positions of switch poles 64, 65 and 66, corresponding modes of operation are obtained except that dual wavelength pairs of keying pulses 3, 4 and 5, 6 are respectively utilized, along with the photomultiplier responses corresponding to the second and third dual wavelength channels. The density calibration screen disc 27 comprises a main annular body substantially equal in outside diameter to the filter disc 23 and having an inner concentric circular opening dimenisoned to slidably fit on the collar portion 26. The disc 27 is formed with apertures arranged to register with the filter windows of disc 23, there being six such apertures in the typical embodiment described herein. Mounted in alternate apertures are respective density screens 71, 72 and 73, for example, disc with small perforations uniformly distributed thereover, having predetermined known optical density effects. The disc member 27 is provided with opposed spring fingers 74, 74 engageable in peripheral notches 75 formed in filter disc 23 to at times detachably secure the calibration disc 27 to the filter disc 23 for rotation therewith, with the density screens aligned with the reference wavelength filter windows, for example, as illustrated in FIG. 8. With the cuvette 11 empty, the instrument will then provide a response for a particular channel which will be in accordance with the known optical density of the screen element adjacent the reference wavelength filter window of that channel, and the instrument can then be calibrated accordingly by means of the variable attenuator device 39.

The screen elements 71, 72 and 73 may have different known optical densities, for providing corresponding different calibration levels.

Disc member 27 may be provided on its side opposite filter disc 23 with opposite horizontal supporting pins 76, 76 releasable lockingly engageable with apertures in respective stationary brackets 77,77 secured on the frame 78 of the instrument and located so as to hold the disc member in a position such that one of the vacant apertures 79 thereof will be in the optical path defined between lenses 20 and 21, so that the calibration disc 27 will not interfere with teh subsequent operation of the instrument after it has been calibrated. Thus, after calibration, the disc member 27 may be moved rightwardly from the position thereof shown in FIGS. 1 and 8 and rotated to engage pins 76 in the apertures of brackets 77, as shown in dotted view in FIG. 8, so that the calibration disc 27 will then be held in a non-interfering position with respect to filter disc 23.

The calibration disc may be adjustably mounted on the filter disc to rotate therewith, with a means to releasably fasten the calibration disc either in a calibration position with the appropriate calibration screen element overlying a filter window or in a non-interfering position with an aperture thereof registering with the filter window. With this arrangement, spring detents cooperating with locking recesses may be used to releasably lock the calibration disc in the desired position. FIGS. 11 and 12 show such an arrangement, wherein the calibration disc 27' is rotatably mounted on a flanged collar portion 26' of the filter disc, shown at 23'. The flange 80 of said collar portion has an aperture 81 containing a detent ball 82 urged leftwardly, as viewed in FIG. 12, by a leaf spring 83 secured on flange 80, the ball being lockingly engageable with spaced detent recesses 84 located so as to hold disc 27' either in a position wherein the calibration screen element 71 registers with the filter element 29 or in a non-interferingg position wherein an aperture 85 of disc 27' registers with the filter element 29. A stop pin 86 secured in the filter disc and its flange 80 extends through an arcuate slot 87 provided in calabration disc 27' to limit the disc 27' to said two positions of adjustment thereof relative to filter disc 23'. The ball 82, engaging in a selected recess 84 of disc 27' drivingly couples disc 27' to disc 23'.

It will be noted that in the embodiment of FIGS. 11 and 12 the disc 27' has apertures spaced 30° apart rather than 60° apart.

While certain specific embodiments of an improved dual wavelength photometer have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A dual wavelength photometer comprising time-sharing duochromator means cyclically generating a reference beam of one wavelength and a measure beam of a second wavelength, a photosensitive device, means to direct said sequentially generated reference and measure beams toward said photosensitive device, means to support a sample in the path of the sequential beams reaching said photosensitive device whereby to generate respective sequential responses of said photosensitive device in accordance with the absorbances by the sample of the reference and measure beams, means to generate respective substantially concurrent steady signals having amplitudes in accordance with said responses, and means to measure the difference in the amplitudes of said steady signals, wherein the means to generate the respective steady signals and to measure the difference in their amplitudes comprises a differential amplifier, respective steady signal-generating amplifiers connected to the inputs of said differential amplifier, respective keyed circuit means alternately drivingly connecting the photosensitive device to said steady signal-generating amplifiers, means to key said keyed circuit means in synchronism with said sequentially generated reference and measure beams, and indicating means connected to the output of said differential amplifier.

2. The dual wavelength photometer of claim 1, and wherein each steady signal-generating amplifier is provided with a capacitor connected directly across its input and output terminals and with a discharge resistor connected in parallel with the capacitor through its keyed circuit means to allow the voltage drop across each steady signal-generating amplifier to adjust with changing amplitudes of its input pulses.

3. The dual wavelength photometer of claim 1, and wherein said duochromator means is of the rotary type and said keying means comprises a rotary disc member coupled to said rotary duochromator means, a light source on one side of said disc member, a second photosensitive device on the other side of said disc member, said disc member having an aperture located so as to become aligned with said light source and said second photosensitive device simultaneously with the generation of one of said beams, circuit means operatively connecting said second photosensitive device to one of said keyed circuit means, and means to operate the other keyed circuit means after a time delay corresponding to the phase angle spacing between the two beams.

4. The dual wavelength photometer of claim 3, and wherein the means to operate the other keyed circuit means comprises a timed signal generating circuit connected between said second photosensitive device and said other keyed circuit means, said timed signal generating circuit having means to generate an output signal at a time delay after excitation thereof corresponding to the phase angle spacing between the two beams.

5. The dual wavelength photometer of claim 1, and wherein the duochromator means comprises a light source, a rotating member located between said light source and said sample-supporting means, said rotating member having two spaced filters arranged to be alternately interposed between the light source and the sample-supporting means, one filter being arranged to pass only light of reference beam wavelength and the other filter being arranged to pass only light of measure beam wavelength, a calibration disc member rotatably engaged with said rotating member and having a window of predetermined optical density at the same radial distance from the axis of rotation of said rotating member as said filters, means to at times secure said calibration disc member to said rotating member with said window overlying one of the filters, and means to at other times hold the calibration disc member in a non-interfering position with respect to the optical path between said light source and the sample-supporting means.

6. The dual wavelength photometer of claim 5, and wherein said rotating member has a collar portion and said disc member is rotatably mounted on said collar portion.

7. The dual wavelength photometer of claim 1, and wherein said sample-supporting means comprises a transparent-walled titration cuvette having a top cover element, said top cover element having a downwardly concave bottom surface and being provided with titrant inlet conduit means connected to the outer portion thereof and fluid outlet conduit means connected to its center portion.

8. The dual wavelength photometer of claim 1, and wherein said reference beam is of a wavelength at which there is substantially no absorbance difference when passed through either oxygenated or deoxygenated blood and wherein said measure beam is of a wavelength at which there is substantially maximum absorbance difference when passed respectively through oxygenated and deoxygenated blood.

9. The dual wavelength photometer of claim 1, and means to admit a titrating reagent into said sample-supporting means so as to react with the sample while said beams are passing through the sample.

10. The dual wavelength photometer of claim 8, and means to admit an oxygenating reagent into said sample-supporting means so as to oxygenate the sample while said beams are passing through the sample.

11. The dual wavelength photometer of claim 1, and wherein the reference beam comprises light of 448 nm wavelength and the measure beam comprises light of 439 nm wavelength.

12. The dual wavelength photometer of claim 1, and wherein said time-sharing duochromator means comprises a light source, a rotating member located between said light source and said sample supporting means, said rotating member having two spaced filters arranged to be alternately interposed between the light source and the sample-supporting means, one of said filters being arranged to pass only light of reference beam wavelength and the other filter being arranged to pass only light of measure beam wavelength.

13. The dual wavelength photometer of claim 12, and wherein one filter is arranged to pass light only of 448 nm wavelength andthe other filter is arranged to pass only light of 439 nm wavelength.

14. The dual wavelength photometer of claim 1, and wherein said time-sharing duochromator means comprises a light source, a rotating member located between said light source and said sample-supporting means, said rotating member having two spaced filters arranged to be alternately interposed between the light source and the sample-supporting means, one filter being arranged to pass only light of reference beam wavelength and the other filter being arranged to pass only light of measure beam wavelength, and rotary drive means connected to said rotating member, and wherein said keying means comprises a rotary disc member coupled to said drive means, an auxiliary light source on one side of said disc member, a second photosensitive device on the other side of said disc member, said disc member having an aperture located so as to become aligned with said auxiliary light source and said second photo-sensitive device simultaneously with the interposition of one of said filters between the first-named light source and said sample supporting means, circuit means operatively connecting said second photosensitive device to one of said keyed circuit means, and means to operate the other keyed circuit means after a time delay corresponding to the spacing between the two filters.

15. The dual wavelength photometer of claim 14, and wherein the means to operate the other keyed circuit means comprises a timed signal-generating circuit connected between said second photosensitive device and said other keyed circuit means, said timed signal-generating circuit having means to generate an output signal at a time delay after excitation thereof corresponding to the spacing between the two filters.

16. The dual wavelength photometer of claim 1, and a logarithmic amplifier connected between said photosensitive device and said steady signal generating amplifiers.

* * * * *

UNITED STATES PATENT OFFICE
CERTIFICATE OF CORRECTION

Patent No. 3,787,124          Dated January 22, 1974

Inventor(s) George W. Lowy; Paul Priarone; Herbert M. Cullis

It is certified that error appears in the above-identified patent and that said Letters Patent are hereby corrected as shown below:

Column 2, line 32, change "itslef" to -- itself --;

line 56, change "typically" to -- optically --.

Column 5, line 30, change "is" to -- if --;

line 38, change "pyotomultiplier" to -- photomultiplier --;

line 39, change "photomultipler" to -- photomultiplier --;

line 43, change "synchromism" to -- synchronism --.

Column 6, line 60, change "monstable" to -- monostable --.

Column 7, line 27, change "photomultipler" to -- photomultiplier --.

Column 8, line 39, change "teh" to -- the --.

Signed and sealed this 1st day of October 1974.

(SEAL)
Attest:

McCOY M. GIBSON JR.          C. MARSHALL DANN
Attesting Officer          Commissioner of Patents